United States Patent [19]

Calundann et al.

[11] 4,224,433

[45] Sep. 23, 1980

[54] THERMOTROPIC POLYESTERS OF 2,6-DIHYDROXYANTHRAQUINONE

[75] Inventors: Gordon W. Calundann, N. Plainfield; Larry F. Charbonneau, Chatham Morris, both of N.J.

[73] Assignee: Celanese Corporation, New York, N.Y.

[21] Appl. No.: 21,050

[22] Filed: Mar. 16, 1979

[51] Int. Cl.² .................. C08G 63/06; C08G 63/18; C08G 63/60
[52] U.S. Cl. .................. 528/128; 528/125; 528/173; 528/190; 528/481; 528/483
[58] Field of Search ............ 528/173, 190, 125, 128, 528/481, 483

[56] References Cited

U.S. PATENT DOCUMENTS

| | | | |
|---|---|---|---|
| 3,721,649 | 3/1973 | Dominguez-Burguette | 528/190 |
| 3,876,724 | 4/1975 | Dominguez-Burguette | 528/190 |
| 4,067,852 | 1/1978 | Calundann | 528/190 |
| 4,130,545 | 12/1978 | Calundann | 528/190 |
| 4,161,470 | 7/1979 | Calundann | 528/190 |

*Primary Examiner*—Lester L. Lee
*Attorney, Agent, or Firm*—Kenneth A. Genoni

[57] ABSTRACT

A thermotropic wholly aromatic polyester is provided which is capable of forming an anisotropic melt phase. This novel polyester displays surprising tractability and may be used as a molding resin or may be melt spun into fibers. The aromatic polyester of the present invention consists essentially of the recurring units (a) 2,6-dioxyanthraquinone moiety, (b) 4-oxybenzoyl moiety, and (c) aromatic diacid moiety. The resulting polyester exhibits a melting point below approximately 375° C., and preferably below approximately 350° C. Fibers which are melt spun from the polyester exhibit unexpectedly good thermal stability. The desirable tractability properties of the polyester are attributed to its anisotropic melt phase, which is due to the inclusion of the 2,6-dioxyanthraquinone moiety in the polymer.

21 Claims, No Drawings

THERMOTROPIC POLYESTERS OF 2,6-DIHYDROXYANTHRAQUINONE

BACKGROUND OF THE INVENTION

Wholly aromatic polyester resins long have been known. For instance, 4-hydroxybenzoic acid homopolymer and copolymers have been provided in the past and are commercially available. Those wholly aromatic polyesters normally encountered in the prior art have tended to be somewhat intractable in nature and to present substantial difficulties if one attempts to melt process the same while employing conventional melt processing procedures. Such polymers commonly are crystalline in nature, relatively high melting or possess a decomposition temperature which is below the melting point, and when molten frequently exhibit an isotropic melt phase. Molding techniques such as compression molding or sintering may be utilized with such materials; however, injection molding, melt spinning, etc., commonly have not been viable alternatives or when attempted commonly have been accomplished with difficulty.

Representative publications which discuss wholly aromatic polyesters include: (a) *Polyesters of Hydroxybenzoic Acids*, by Russell Gilkey and John R. Caldwell, J. of Applied Polymer Sci., Vol. II, Pages 198 to 202 (1959), (b) *Polyarylates (Polyesters From Aromatic Dicarboxylic Acids and Bisphenols)*, by G. Bier, Polymer, Vol. 15, Pages 527 to 535 (August 1974), (c) *Aromatic Polyester Plastics*, by S. G. Cottis, Modern Plastics, Pages 62 to 63 (July 1975), and (d) *Poly(p-Oxybenzoyl Systems): Homopolymer for Coatings: Copolymers for Compression and Injection Molding*, by Roger S. Storm and Steve G. Cottis, Coatings Plast. Preprint, Vol. 34, No. 1, Pages 194 to 197 (April 1974). See also, U.S. Pat. Nos. 3,039,994; 3,169,121; 3,321,437; 3,553,167; 3,637,595; 3,651,014; 3,723,388; 3,759,870; 3,767,621; 3,778,410; 3,787,370; 3,790,528; 3,829,406; 3,890,256; and 3,975,487.

Also, it more recently has been disclosed that certain polyesters may be formed which exhibit melt anisotropy. See for instance, (a) *Polyester X7G-A Self Reinforced Thermoplastic*, by W. J. Jackson Jr., H. F. Kuhfuss, and T. F. Gray, Jr., 30th Anniversary Technical Conference, 1975 Reinforced Plastics/Composites Institute. The Society of the Plastics Industry, Inc., Section 17-D, Pages 1 to 4, (b) Belgian Pat. Nos. 828,935 and 828,936, (c) Dutch Pat. No. 7505551, (d) West German Pat. Nos. 2520819, 2520820, and 2,722,120, (e) Japanese Pat. No. 43-223, (f) U.S. Pat. Nos. 3,991,013; 3,991,014; 4,057,597; 4,067,852; 4,075,262; 4,083,829; 4,118,372; 4,130,545; and 4,130,702. See also commonly assigned U.S. Ser. Nos. 843,933, filed Oct. 20, 1977 (now U.S. Pat. No. 4,161,470); and 877,917, filed Feb. 15, 1978.

U.S. Pat. No. 4,067,852, assigned to Celanese Corporation, discloses a wholly aromatic polyester consisting essentially of the recurring units (a) 4-oxybenzoyl moiety, (b) 2,6-dicarboxynaphthalene moiety, and (c) symmetrical dioxy aryl moiety (as defined therein). U.S. Pat. No. 4,083,829, also assigned to Celanese Corp., discloses a wholly aromatic polyester consisting essentially of the recurring units (a) 4-oxybenzoyl moiety, (b) 2,6-dicarboxynaphthalene moiety, (c) symmetrical dioxy aryl moiety (as defined therein), and (d) isophthaloyl and/or meta-dioxy phenylene moiety. These patents can be distinguished from the present invention in that the present invention does not include the use of a 2,6-dicarboxynaphthalene moiety. Neither of the above-mentioned patents specifically discloses the use of 2,6-dihydroxyanthraquinone, which is believed to be the novel feature of the present invention.

It is an object of the present invention to provide a melt processable wholly aromatic polyester.

It is an object of the present invention to provide a wholly aromatic polyester, having a low degree of crystallinity in the solid phase, which forms an anisotropic melt phase.

It is an object of the present invention to provide a melt processable aromatic polyester capable of forming a anisotropic melt phase at a temperature below approximately 375° C., and preferably below approximately 350° C.

It is an object of the present invention to provide a wholly aromatic polyester having high thermal stability.

It is an object of the present invention to provide a wholly aromatic polyester which exhibits an anisotropic melt which is highly tractable.

It is an object of the present invention to provide a wholly aromatic polyester which may be melt spun to form a high-strength fiber having superior properties.

It is an object of the present invention to provide a wholly aromatic polyester which readily may be injection molded to form a molded article exhibiting superior properties (tensile strength, flex strength, impact strength).

It is an object of the present invention to provide a wholly aromatic polyester which exhibits good hydrolytic stability.

These and other objects of the invention will be apparent from the following detailed description and appended claims.

SUMMARY OF THE INVENTION

It has been found that an improved melt processable wholly aromatic polyester capable of forming an anisotropic melt phase at a temperature below approximately 375° C. consists essentially of the recurring moieties I, II, and III, wherein:

I is

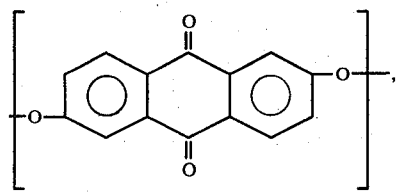

II is

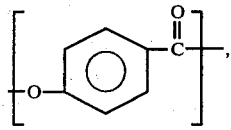

and

III is a dicarboxy aryl moiety of the formula

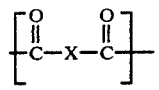

where X is selected from at least one member of the group consisting of
(a) 1,3-phenylene radicals which optionally are replaced with up to 75 mole percent of 1,4-phenylene radicals based upon the total concentration of 1,3-phenylene and 1,4-phenylene radicals present in the polyester,
(b)

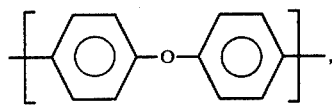

(c)

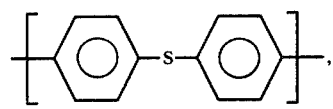

and
(d)

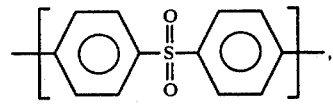

and where the polyester comprises approximately 15 to 30 mole percent of moiety I, approximately 35 to 70 mole percent of moiety II, and approximately 15 to 30 mole percent of moiety III. In a preferred embodiment, the polyester comprises approximately 20 to 30 mole percent of moiety I, 40 to 60 mole percent of moiety II, and 20 to 30 mole percent of moiety III. In another preferred embodiment, moiety III is such that X represents 1,3-phenylene radical, either by itself or in admixture with up to 75 mole percent of 1,4-phenylene radical. In a more preferred embodiment, X represents an admixture of approximately 37.5 to 75 mole percent of 1,3-phenylene radical and approximately 25 to 62.5 mole percent of 1,4-phenylene radical. In a still more preferred embodiment, X represents an admixture of approximately 50 mole percent each of 1,3-phenylene radical and 1,4-phenylene radical. In a particularly preferred embodiment, the polyester comprises approximately 20 mole percent of moiety I, approximately 60 mole percent of moiety II, and approximately 20 mole percent of moiety III, wherein X represents an admixture of approximately 50 mole percent each of 1,3-phenylene radical and 1,4-phenylene radical.

DESCRIPTION OF PREFERRED EMBODIMENTS

The wholly aromatic polyester of the present invention consists essentially of three recurring moieties which, when combined in the polyester, have been found to form an atypical anisotropic melt phase at a temperature below approximately 375° C., and preferably below about 350° C. Such polyester may be crystalline or amorphous in the solid phase and, because of its ability to exhibit ordered anisotropic properties in the melt (i.e., liquid crystals), readily can be melt processed with ease. The usual difficulties incurred when one attempts to melt process aromatic polyesters by conventional melt processing techniques effectively are eliminated. The aromatic polyester is considered to be "wholly" aromatic in the sense that each moiety present in the polyester contributes at least one aromatic ring to the polymer backbone, without adding intervening aliphatic moieties.

The wholly aromatic polyester consists essentially of three essential moieties. Moiety I can be termed a 2,6-dioxyanthraquinone moiety and possesses the structural formula:

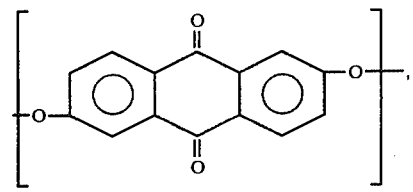

Moiety I comprises approximately 15 to 30 mole percent of the wholly aromatic polyester, and preferably approximately 20 to 30 mole percent, and most preferably approximately 20 mole percent. 2,6-dihydroxyanthraquinone is available commercially under the common name anthraflavic acid from Imperial Chemical Industries and others. It is the inclusion of 2,6-dihydroxyanthraquinone in the polyester which gives the polymer its unexpected tractability and anisotropic melt phase.

The second key recurring unit (moiety II) of the wholly aromatic polyester is a 4-oxybenzoyl moiety of the structural formula:

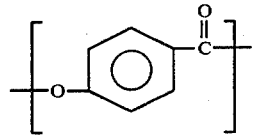

Moiety II comprises approximately 35 to 70 mole percent of the wholly aromatic polyester, and preferably 40 to 60 mole percent, and most preferably 50 to 60 mole percent (e.g., 60 mole percent).

The third essential recurring unit (moiety III) of the wholly aromatic polyester is a dicarboxy aryl moiety of the formula

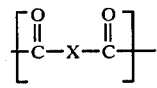

and mixtures thereof where X is a divalent aromatic radical, as defined hereinafter. Moiety III comprises approximately 15 to 30 mole percent of the polyester, and preferably approximately 20 to 30 mole percent (e.g., 20 mole percent). Preferred examples of moiety III are:
(a)

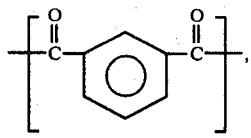

either alone or in admixture with

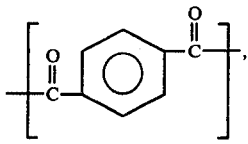

(b)

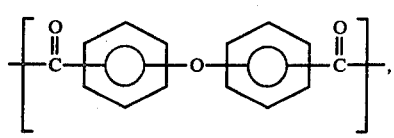

(c)

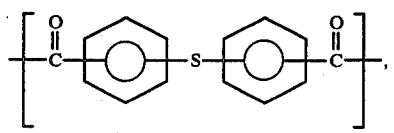

(d)

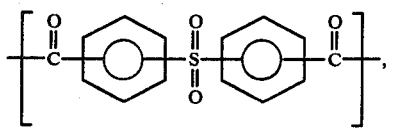

and mixtures of the foregoing.

It has been found that best results are obtained with a mixture of isophthalic acid (IA) and terephthalic acid (TA), corresponding to example (a) above. In a preferred embodiment, the mixture contains approximately 0 to 75 mole percent TA and approximately 25 to 100 mole percent IA. In a more preferred embodiment, the mixture contains approximately 25 to 62.5 mole percent TA and approximately 37.5 to 75 percent IA. The most preferable mixture contains 50 mole percent each of TA and IA.

It was found that a mixture of TA and IA was necessary to obtain maximum tractability and anisotropicity. If TA were used by itself as moiety III, a polyester with an undesirably high melting temperature would result. When IA alone is used, there is a decrease in anisotropicity. Although not a preferred embodiment, it is believed that the use of IA alone as moiety III would yield a polymer having sufficiently desirable properties.

A preferred wholly aromatic polyester capable of forming an anisotropic melt phase at a temperature below approximately 375° C. which is particularly suited for melt spinning into fibers consists of the recurring moieties I, II, and III, wherein:

I is (a)

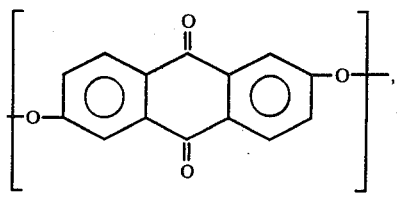

II is

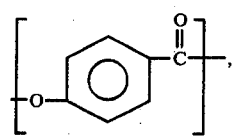

III is a mixture of 50 mole percent (a)

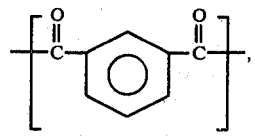

and 50 mole percent

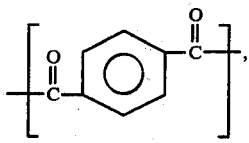

and wherein said polyester comprises approximately 20 mole percent of moiety I, approximately 60 mole percent of moiety II, and approximately 20 mole percent of moiety III.

Ester-forming moieties (e.g., dicarboxy or dioxy units) other than those previously mentioned may also be included in the wholly aromatic polyester of the present invention in a minor concentration as long as such moieties do not adversely influence the desired anisotropic melt phase exhibited by the polyester heretofore defined. As will be apparent to those skilled in the art, the total molar quantities of dicarboxy units and dioxy units present within the wholly aromatic polyester will be substantially equal. The various moieties upon polymer formation will tend to be present in a random configuration.

The wholly aromatic polyesters commonly exhibit a weight average molecular weight of about 2,000 to 200,000 and preferably about 10,000 to 25,000, e.g., about 20,000 to 22,000. Such molecular weight may be conveniently determined by standard techniques not involving the solutioning of the polymer (e.g., by end group determination via infrared spectroscopy on compression molded films), or by the testing of a solution of the polymer in pentafluorophenol via light scattering techniques, etc.

The wholly aromatic polyesters of the present invention tend to be substantially insoluble in all common polyester solvents, such as hexafluoroisopropanol and o-chlorophenol, and accordingly generally are not susceptible to solution processing. They can surprisingly be readily processed by common melt processing techniques as discussed hereafter, and particularly are suited for melt extrusion to form fibers. The polymer commonly is soluble in pentafluorophenol.

The wholly aromatic polyesters prior to heat treatment additionally commonly exhibit an inherent viscosity (i.e., I.V.) of approximately 0.5 to 7, preferably 2 to 3.5, and most preferably 2.5 to 3.0 when dissolved in a concentration of 0.1 percent by weight in pentafluorophenol at 60° C.

The wholly aromatic polyesters of the present invention have a melting point of below approximately 375° C., and preferably of approximately 315° to 350° C. The melting point was determined by differential scanning calorimetry (DSC) at a heating rate of 20° C. per minute.

The wholly aromatic polyesters of the present invention commonly exhibit

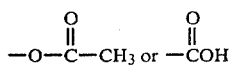

end groups depending upon the synthesis route selected. As will be apparent to those skilled in the art, the end groups optionally may be capped. For example, acidic end groups may be capped with a variety of alcohols, and hydroxyl end groups may be capped with a variety of organic acids. For instance, end capping units such as phenyl ester

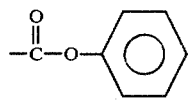

and methylester

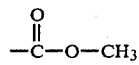

optionally may be included at the end of the polymer chains. The polymer also may be oxidatively cross-linked to at least some degree, if desired, by heating in an oxygen-containing atmosphere (e.g., air) while in bulk form or as a previously shaped article at a temperature below its melting point for a limited period of time (e.g., for a few minutes).

Unlike the aromatic polyesters commonly encountered in the prior art, the wholly aromatic polyesters of the present invention are not intractable and form an anisotropic melt phase whereby an atypical degree of order is manifest in the molten polymer. The subject polyester readily forms liquid crystals in the melt phase and accordingly exhibits a high tendency for the polymer chains to orient in the shear direction. Such anisotropic properties are manifest at a temperature which is amenable for melt processing in order to form shaped articles. Such anisotropy in the melt may be confirmed by conventional polarized light techniques whereby crossed-polarizers are utilized. More specifically, the anisotropic melt phase may be confirmed conveniently by the use of a Leitz polarizing microscope at a magnification of 40X with the sample on a Leitz hot stage and under a nitrogen atmosphere. The polymer melt is optically anisotropic, i.e., it transmits light when examined between crossed polarizers. The amount of light transmitted increases when the sample is sheared (i.e., is made to flow); however, the sample is optically anisotropic even in the static state. On the contrary, typical aromatic polyesters do not transmit light to any substantial degree when examined under identical conditions.

The wholly aromatic polyester of the present invention may be formed by a variety of ester-forming techniques whereby organic monomer compounds possessing functional groups which upon condensation form the requisite recurring moieties are reacted. For instance, the functional groups of the organic monomer compounds may be carboxylic acid groups, hydroxyl groups, ester groups, acyloxy groups, acid halides, etc.

The organic monomer compounds may be reacted in the absence of a heat exchange fluid via a melt acidolysis procedure. The monomers are melted in an inert atmosphere. Polymerization is initiated at approximately 250° C. After about 60 percent of the theoretical amount of acetic acid has been removed, the temperature is raised to approximately 280° C. After about 80 percent of the theoretical amount of acetic acid has been removed, the temperature is increased further, and a vacuum is applied while the temperature is within the range of 300° to 320° C. The vacuum is continued until a pressure of 1.0 Torr or less is attained. The reaction vessel is then cooled and broken to recover polymer.

As set forth in commonly assigned U.S. Pat. No. 4,067,852, of Gordon W. Calundann, entitled "Improved Melt Processable Thermotropic Wholly Aromatic Polyester and Process for Its Production" is described a slurry polymerization process which may be employed to form the wholly aromatic polyester of the present invention wherein the solid product is suspended in a heat exchange medium. The disclosure of this copending application is herein incorporated by reference.

When employing either the melt acidolysis procedure or the slurry procedure of U.S. Pat. No. 4,067,852, the organic monomer reactants from which the 2,6-dioxyanthraquinone moiety (i.e., moiety I) and the 4-oxybenzoyl moiety (i.e., moiety II) are derived may be initially provided in a modified form whereby the usual hydroxyl groups of these monomers are esterified (i.e., they are provided as acyl esters). For instance, lower acyl esters of 2,6-dihydroxyanthraquinone and 4-hydroxybenzoic acid wherein the hydroxy groups are esterified may be provided as reactants. The lower acyl groups preferably have from about 2 to about 4 carbon atoms. Preferably the acetate esters of the organic compounds which form moieties I and II are provided. Accordingly, particularly preferred reactants for the condensation reaction are 2,6-diacetoxyanthraquinone and 4-acetoxybenzoic acid. If minor quantities of other aryl reactants (as previously discussed) optionally provide oxy-units within the resulting polymer, these too preferably are provided as the corresponding lower acyl esters. Relative quantities of organic monomer reactants are provided in the reaction zone so that the potential dicarboxy units and dioxy units available for incorporation in the resulting wholly aromatic polyester are substantially equal.

Representative catalysts which optionally may be employed in either the melt hydrolysis procedure or in the procedure of U.S. Pat. No. 4,067,852 include dialkyl tin oxide (e.g., dibutyl tin oxide), diaryl tin oxide, titanium dioxide, alkoxy titanium silicates, titanium alkoxides, alkali and alkaline earth metal salts of carboxylic acids, the gaseous acid catalysts such as Lewis acids (e.g., BF$_3$), hydrogen halides (e.g., HCl), etc. The quantity of catalyst utilized typically is about 0.001 to 1 percent by weight based upon the total monomer weight, and most commonly about 0.01 to 0.2 percent by weight.

The molecular weight of a previously formed wholly aromatic polyester may be further increased via a solid state polymerization procedure wherein the particulate polymer is heated in an inert atmosphere (e.g., in a nitrogen atmosphere) at a temperature of about 260° C. for 10 to 12 hours.

The wholly aromatic polyester of the present invention readily can be melt processed to form a variety of shaped articles, e.g., molded three-dimensional articles, fibers, films, tapes, etc. The polyester of the present invention is suited for molding applications and may be molded via standard injection molding techniques commonly utilized when forming molded articles. Unlike the wholly aromatic polyesters commonly encountered in the prior art, it is not essential that more severe injection molding conditions (e.g., higher temperatures), compression molding, impact molding, or plasma spraying techniques be utilized. Fibers or films may be melt extruded.

A molding compound may be formed from the wholly aromatic polyester of the present invention which incorporates approximately 1 to 60 percent by weight of a solid filler (e.g., talc) and/or reinforcing agent (e.g., glass fibers).

The wholly aromatic polyester also may be employed as a coating material which is applied as a powder or from a liquid dispersion.

When forming fibers and films the extrusion orifice may be selected from among those commonly utilized during the melt extrusion of such shaped articles. For instance, the shaped extrusion orifice may be in the form of a rectangular slit (i.e., a slit die) when forming a polymeric film. When forming a filamentary material the spinneret selected may contain one and preferably a plurality of extrusion orifices. For instance, a standard conical spinneret containing 1 to 2000 holes (e.g., 6 to 1500 holes) such as commonly used in the melt spinning of polyethylene terephthalate, having a diameter of about 1 to 60 mils (e.g., 5 to 40 mils) may be utilized. Yarns of about 20 to 200 continuous filaments are commonly formed. The melt-spinnable wholly aromatic polyester is supplied to the extrusion orifice at a temperature above its melting point, e.g., a temperature of about 320° to 390° C.

Subsequent to extrusion through the shaped orifice the resulting filamentary material or film is passed in the direction of its length through a solidification or quench zone wherein the molten filamentary material or film is transformed to a solid filamentary material or film. The resulting fibers commonly have a denier per filament of about 1 to 50, and preferably a denier per filament of about 1 to 20.

The resulting filamentary material or film optionally may be subjected to a thermal treatment whereby its physical properties are further enhanced. The tenacity of the fiber or film generally is increased by such thermal treatment. More specifically, the fibers or films may be thermally treated in an inert atmosphere (e.g., nitrogen, argon, helium or steam) or in a flowing oxygen-containing atmosphere (e.g., air) with or without stress at a temperature below the polymer melting point until the desired property enhancement is achieved. Thermal treatment times commonly range from a few minutes to several days. As the fiber is thermally treated, its melting temperature progressively is raised. The temperature of the atmosphere may be staged or continuously increased during the thermal treatment or held at a constant level. For instance, the fiber may be heated at 250° C. for one hour, at 260° C. for one hour, and at 270° C. for one hour. Alternatively, the fiber may be heated at about 15° to 20° C. below the temperature at which it melts for about 48 hours. Optimum heat treatment conditions will vary with the specific composition of the wholly aromatic polyester and with the fiber's process history.

The as-spun fibers formed from the wholly aromatic polyester of the present invention are fully oriented and exhibit highly satisfactory physical properties which render them suitable for use in high performance applications. The as-spun fibers commonly exhibit an average single filament tenacity of at least 5 grams per denier (e.g., about 5 to 15 grams per denier), and average single filament tensile modulus of at least about 300 grams per denier (e.g., about 300 to 1000 grams per denier), and exhibit an extraordinary dimensional stability at elevated temperature (e.g., at temperatures of about 100° to 150° C.). Following thermal treatment (i.e., annealing) the fibers commonly exhibit an average single filament tenacity of at least 10 grams per denier (e.g., 10 to 30 grams per denier), and an average single filament tensile modulus of at least 300 grams per denier measured at ambient conditions (e.g., 72° F. and 65 percent relative humidity). Such properties enable the fibers to be used with particular advantage as tire cords and in other industrial applications, such as conveyor belts, hose, cabling, resin reinforcement, etc. Films formed of the wholly aromatic polyesters of the present invention may be used as strapping tape, cable wrap, magnetic tape, electric motor dielectric film, etc. The fibers and films exhibit an inherent resistance to burning.

The following examples are presented as specific illustrations of the claimed invention. It should be understood, however, that the invention is not limited to the specific details set forth in the examples.

EXAMPLE I

To a three-neck, round flask equipped with a stirrer, nitrogen inlet tube, and a distillation head connected to a condenser were added the following:

(a) 48.6 g. 2,6-dihydroxyanthraquinone diacetate (0.15 mole),
(b) 54.05 g. 4-acetoxybenzoic acid (0.3 mole),
(c) 12.46 g. isophthalic acid (0.075 mole), and
(d) 12.46 g. terephthalic acid (0.075 mole).

The monomers were melted under an atmosphere of nitrogen at 250° C. The reactants were then heated at 250° C. for 2½ hours, at 270° C. for ½ hour, and then at 280° C. for ½ hour. About 30 ml. of acetic acid was collected between 250° C. and 280° C. The temperature of the flask was then raised to 315° C. over the next hour. As the temperature was raised from 300° C. to 315° C. over a period of about 20 minutes, the pressure of the reaction vessel was reduced from atmospheric pressure to 1.0 Torr in order to remove additional acetic acid. The reaction vessel was cooled to 200° C. under vacuum, placed in a nitrogen atmosphere, and further cooled to room temperature (about 25° C.). The polymerization flask was broken to recover polymer. The polymer was ground in a Wiley mill (#10 screen) and washed with low-boiling petroleum ether.

The polymer was further polymerized in the solid state at temperatures up to 250° C. for 12 hours. Polymer was placed on a fritted glass disc inside a cylindrical glass vessel. Nitrogen was passed through the cylinder at a rate of approximately 0.1 to 0.2 liter/minute. The cylinder was immersed in an oil bath at 250° C.

The resulting wholly aromatic polyester had an inherent viscosity (I.V.) of 1.9 as determined in a pentafluorophenol solution of 0.1 percent concentration, by weight, at 60° C.

$$I.V. = \frac{\ln(\eta \text{rel})}{c}$$

Where c=concentration of solution (here, 0.1 percent by weight), and η rel=relative viscosity. The relative viscosity was measured as the ratio of the time required for polymer solution to flow through a viscometer to the time required for the solvent alone to flow through the viscometer. The apparatus used was an Ubbelohde dilution type 100 viscometer.

This polymer had a glass transition temperature (Tg) of 130° C., and the onset of melting (Tm) occurred at 345° C., as measured by differential scanning calorimetry (DSC) at a heating rate of 20° C. per minute.

Fiber was spun from this polymer at a temperature of 360° C. through a spinneret provided with a single hole jet having a diameter of 7 mils and a length of 10 mils. An 80 to 120 mesh shattered metal filter pack preceded the cone entrance to the die. Wind-up speed for the monofilament was 150 meters/minute and polymer melt residence time was approximately 2 minutes.

The resulting as-spun wholly aromatic polyester fiber exhibited a denier per filament of 10.27 and the following average single filament properties:

| Tenacity (grams per denier) | 7.2 |
| --- | --- |
| Modulus (grams per denier) | 584 |
| Elongation (percent) | 1.4 |

Following thermal treatment in a dry nitrogen flow by raising the temperature in an oven to 275° C. over an 18 hour period, the fiber exhibited the following average single filament properties:

| Tenacity (grams per denier) | 13.8 |
| --- | --- |
| Modulus (grams per denier) | 637 |
| Elongation (percent) | 2.32 |

Another fiber was spun from this same polymer at 360° C. at a take-up speed of 436 meters/minute. It exhibited a denier per filament of 3.5 and the following as-spun average single filament properties:

| Tenacity (grams per denier) | 6.4 |
| --- | --- |
| Modulus (grams per denier) | 652 |
| Elongation (percent) | 1.1 |

Following thermal treatment at 260° C. for 18 hours, this fiber exhibited the following properties:

| Tenacity (grams per denier) | 17.0 |
| --- | --- |
| Modulus (grams per denier) | 786 |
| Elongation (percent) | 2.28 |

EXAMPLE II

Example I was substantially repeated with the exception that the following ingredients were charged to the flask:
(a) 27.924 g. of 2,6-dihydroxyanthraquinone diacetate (0.0861 mole),
(b) 46.550 g. of 4-acetoxybenzoic acid (0.258 mole),
(c) 7.154 g. of isophthalic acid (0.0431 mole), and
(d) 7.154 g. of terephthalic acid (0.0431 mole).

Post-polymerization in the solid state was conducted under a nitrogen atmosphere at 250° C. for 8 hours.

The resulting wholly aromatic polyester had an I.V. of 2.68, when determined as in Example I. The polymer had a Tg of 125° C. and a Tm of 365° C., when measured by differential scanning calorimetry.

Following melt extrusion at 380° C. at a take-up speed of 435 meters/minute using the die and filter pack described in Example 1, the resulting as-spun wholly aromatic polyester fiber exhibited a denier per filament of 8.54 and the following average single filament properties:

| Tenacity (grams per denier) | 7.56 |
| --- | --- |
| Modulus (grams per denier) | 636 |
| Elongation (percent) | 1.37 |

Following heat treatment as in Example 1, the fiber exhibited the following average single filament properties:

| Tenacity (grams per denier) | 19.3 |
| --- | --- |
| Modulus (grams per denier) | 681 |
| Elongation (percent) | 3.37 |

EXAMPLE III

Example I was substantially repeated with the exception that the following ingredients were charged to the flask:
(a) 32.423 g. of 2,6-dihydroxyanthraquinone diacetate (0.10 mole),
(b) 54.05 g. of 4-acetoxybenzoic acid (0.3 mole),
(c) 10.383 g. of isophthalic acid (0.0625 mole), and
(d) 6.230 g. of terephthalic acid (0.0375 mole).

Post-polymerization in the solid state was conducted at 250° C. for 8 hours. The resulting wholly aromatic polyester had an I.V. of 2.61, when determined as in Example I. The polymer had a Tg of 115° C. and a Tm of 340° C., when measured by differential scanning calorimetry.

Following melt extrusion at 370° C. at a take-up speed of 150 meters/minute, this polyester fiber exhibited a denier per filament of 9.28 and the following average single filament properties:

| Tenacity (grams per denier) | 3.21 |
| --- | --- |
| Modulus (grams per denier) | 476 |
| Elongation (percent) | 0.68 |

Further post-polymerization in the solid state was conducted at 290° C. for 8 hours. The resulting polymer had an I.V. of 2.96 and Tm of 350° C.

Following melt extrusion at 375° C. at a take-up speed of 150 meters/minute and a polymer melt residence time of 2 minutes or less, the resulting fiber had a denier per filament of 26.3 and exhibited the following average single filament properties:

| | |
|---|---|
| Tenacity (grams per denier) | 9.3 |
| Modulus (grams per denier) | 525 |
| Elongation (percent) | 2.19 |

Following heat treatment at 240° C. for 60 hours, the fiber exhibited a denier per filament of 23 and the following average single filament properties:

| | |
|---|---|
| Tenacity (grams per denier) | 14.9 |
| Modulus (grams per denier) | 671 |
| Elongation (percent) | 2.9 |

The hydrolytic stability of those fibers formed from polymer which had been subjected to further post-polymerization was examined. Samples of heat-treated and non-heat-treated fibers (60 filaments, 6 inches in length) were placed in sealed tubes with 20 ml. of water and 5 ml. of morpholine. The tubes were heated at 175° C. for 3 hours. The heat-treated fibers exhibited the following properties:

| | |
|---|---|
| Tenacity (grams per denier) | 12.0 |
| Modulus (grams per denier) | 593 |
| Elongation (percent) | 2.37 |
| Denier/filament | 26.2 |

The non-heat-treated fibers exhibited the following properties:

| | |
|---|---|
| Tenacity (grams per denier) | 4.55 |
| Modulus (grams per denier) | 514 |
| Elongation (percent) | 0.95 |
| Denier/filament | filament 25.2 |

Non-heat-treated fiber tenacity decreased to 49 percent of its original value, while heat-treated fiber retained 81 percent of its tenacity.

EXAMPLE IV

Example I was substantially repeated with the exception that the following ingredients were charged to the flask:

(a) 24.317 g. of 2,6-dihydroxyanthraquinone diacetate (0.075 mole),
(b) 63.06 g. of 4-acetoxybenzoic acid (0.35 mole), and
(c) 12.460 g. of isophthalic acid (0.075 mole).

Post-polymerization in the solid state was conducted under a nitrogen atmosphere at 240° C. for 8 hours.

The resulting wholly aromatic polyester had an I.V. of 1.73, measured as in Example I at 90° C. in pentafluorophenol. The polymer had a Tg of 122° C., measured by DSC.

Fiber was spun from this polymer at a temperature of 380° C. through a spinneret provided with a single hole jet having a diameter of 20 mils and a length of 100 mils. An 80 to 120 mesh shattered metal filter pack preceded the cone entrance to the die. Wind-up speed for the monofilament was 244 meters/minute.

The resulting as-spun wholly aromatic polyester fiber exhibited a denier per filament of 7.37 and the following average single filament properties:

| | |
|---|---|
| Tenacity (grams per denier) | 6.62 |
| Modulus (grams per denier) | 557 |
| Elongation (percent) | 1.5 |

EXAMPLE V

Example I was substantially repeated with the exception that the following ingredients were charged to the flask:

(a) 52.8 g. of 2,6-dihydroxyanthraquinone diacetate (0.163 mole),
(b) 88.51 g. of 4-acetoxybenzoic acid (0.49 mole)
(c) 20.29 g. of isophthalic acid (0.122 mole), and
(d) 6.76 g. of terephthalic acid (0.0407 mole).

Post-polymerization in the solid state was conducted at 250° C. for 8 hours. The resulting wholly aromatic polyester had an I.V. of 1.94, when determined as in Example I. The polymer had a Tg of 120° C., when measured by DSC.

Following melt extrusion at 340° C. essentially as in Example I, the resulting polyester fiber had a denier per filament of 10.3 and the following average single filament properties:

| | |
|---|---|
| Tenacity (grams per denier) | 5.7 |
| Modulus (grams per denier) | 579 |
| Elongation (percent) | 1.28 |

A sample of the polymer was extruded into a film 0.52 mil thick and approximately 250 mils wide. The film was extruded at a temperature of 341° C., a through-put of 0.4 g./min., a pressure of 420 p.s.i., and a take-up speed of 1.5 meters/minute. The film was quenched in a slow stream of nitrogen. The film had the following properties:

| | |
|---|---|
| Tensile Strength ($10^3$ p.s.i.) | 22.5 |
| Elongation (percent) | 0.57 |
| Modulus ($10^6$ p.s.i.) | 4.10 |

After heat treatment for 18 hours at 240° C. using the procedures described in Example I for fibers, the film properties were:

| | |
|---|---|
| Tensile Strength ($10^3$ p.s.i.) | 36.2 |
| Elongation (percent) | 1.40 |
| Modulus ($10^6$ p.s.i.) | 3.02 |

The fire resistance of this polymer was examined by measuring the critical oxygen concentration (COC) index. COC is defined as the lowest oxygen concentration in nitrogen at which steady combustion takes place on a vertically positioned polymer specimen after ignition at the top surface. The ignition flame is provided from a 22 gauge syringe through which passes $H_2$ gas which is ignited, thereby yielding a flame having a temperature of about 3,000° C. The COC values are determined in an all-gas testing chamber containing $O_2$ and $N_2$ under quiescent flow conditions. The composition of the $O_2/N_2$ mixtures can be regulated and monitored continuously. A detailed description of the equipment may be found in D. E. Steutz, *Proceedings from the Conference on Fundamentals of Flammability and Combustion of Materials*, Polymer Conference Series, College of Engineering, University of Utah, Salt Lake City, Utah (1970).

Test specimens are obtained from films cut into strips approximately 0.125 in. wide, 2 in. long and 0.04 in. in thickness. These strips are wound loosely with a stainless steel wire of 0.007 in. in diameter. Actual COC values are measured on samples suspended vertically in the testing chamber and ignited at the top surfaces.

When ignited as described above, the polymer was found to have a COC of 25.5. This value is significantly higher than those obtained with other wholly aromatic polyesters.

EXAMPLE VI

Example V was substantially repeated. The resulting polymer had a Tg of 120° C. and an I.V. of 1.78, when measured as in Example I. The polymer was spun at 340° C. as in Example I to give a fiber having a denier per filament of 2.21 and the following average single filament properties:

| | |
|---|---|
| Tenacity (grams per denier) | 6.01 |
| Modulus (grams per denier) | 617 |
| Elongation (percent) | 1.1 |

Following heat treatment at 255° C. as in Example I, the fibers had a denier per filament of 2.16. Improvements in tenacity and modulus were achieved, as shown by the following average single filament properties:

| | |
|---|---|
| Tenacity (grams per denier) | 17.2 |
| Modulus (grams per denier) | 747 |
| Elongation (percent) | 2.35 |

EXAMPLE VII

Example V was substantially repeated in order to produce a polymer from which test samples could be injection molded. The polymer used was a mechanical blend of three batches of polymer produced by the method of Example V. The resulting polymer had an I.V. of 1.27, a Tg of 125° C., and a Tm of 302° C., when measured in Example I.

Tensile bars and flexural strength bars were molded in an Arburg Model 221E/150 machine equipped with an 18 mm. barrel. The barrel temperature was 320° C., and the mold was at room temperature. Cycle times of 35 to 50 seconds were employed.

The tensile bars were dumbbell-shaped specimens 2½ inches long, 1/16 inch thick, and ⅛ inch wide in the gauge portion. The gauge was ½ inch long. The average tensile properties, when measured by standard test procedures, were:

| | |
|---|---|
| Tensile Strength ($10^3$ p.s.i.) | 19.6 |
| Elongation (percent) | 0.94 |
| Modulus ($10^6$ p.s.i.) | 2.42 |

The flexural test bars were 5 inches long, ½ inch wide, and ⅛ inch thick. The average flexural properties, when measured by standard test procedures are listed below:

| | |
|---|---|
| Flexural Strength ($10^3$ p.s.i.) | 25.4 |
| Flexural Modulus ($10^6$ p.s.i.) | 2.4 |

Although the invention has been described with preferred embodiments, it is to be understood that variations and modifications may be employed without departing from the concept of the invention as defined in the following claims.

We claim:

1. A melt processable wholly aromatic polyester capable of forming an anisotropic melt phase at a temperature below approximately 375° C. consisting essentially of moieties I, II, and III wherein:

I is

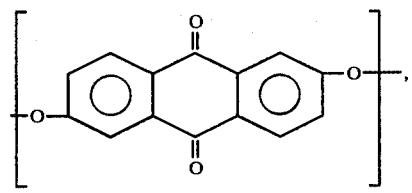

II is

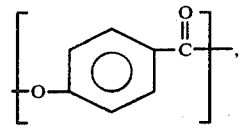

and
III is

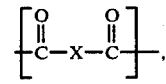

where X is selected from at least one member of the group consisting of
(a) 1,3-phenylene radicals which optionally are replaced with up to 75 mole percent of 1,4-phenylene radicals based upon the total concentration of 1,3-phenylene and 1,4-phenylene radicals present in said polyester,
(b)

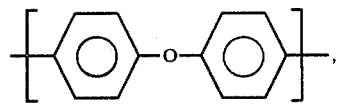

(c)

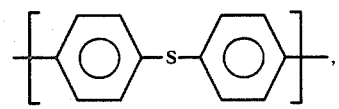

and
(d)

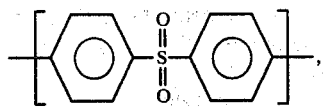

and wherein said polyester comprises approximately 15 to 30 mole percent of moiety I, approximately 35 to 70 mole percent moiety II, and approximately 15 to 30 mole percent of moiety III.

2. A polyester according to claim 1 wherein the polymer comprises approximately 20 to 30 mole percent of moiety I, approximately 40 to 60 mole percent of moiety II, and approximately 20 to 30 mole percent of moiety III.

3. A polyester according to claim 2 wherein the polymer comprises approximately 50 to 60 mole percent of moiety II.

4. A polyester according to claim 1 wherein the molar quantities of moieties I and III are substantially equal.

5. A polyester according to claim 1 wherein the polymer comprises approximately 20 mole percent of moiety I, approximately 60 mole percent of moiety II, and approximately 20 mole percent of moiety III.

6. A fiber which has been melt spun from the wholly aromatic polyester of claim 1.

7. A fiber which has been melt spun from the wholly aromatic polyester of claim 1 and subsequently thermally treated.

8. A polyester according to claim 1 wherein the melting temperature of the polymer is below approximately 350° C.

9. A melt processable wholly aromatic polyester capable of forming an anisotropic melt phase at a temperature below approximately 375° C. consisting essentially of moieties I, II, and III wherein:

I is

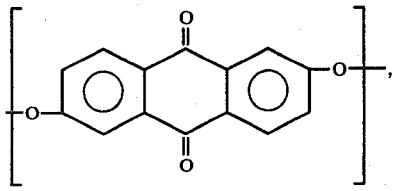

II is

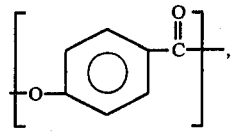

and
III is

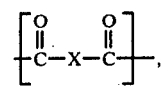

where X represents 1,3-phenylene radicals which optionally are replaced with up to 75 mole percent of 1,4-phenylene radicals based upon the total concentration of moiety III in said polyester, and wherein said polyester comprises approximately 15 to 30 mole percent of moiety I, approximately 35 to 70 mole percent of moiety II, and approximately 15 to 30 mole percent of moiety III.

10. A polyester according to claim 9 wherein said 1,3-phenylene radicals of moiety III are replaced with approximately 25 to 62.5 mole percent of 1,4-phenylene radicals based upon the total concentration of moiety III in said polyester.

11. A polyester according to claim 9 wherein the polymer comprises approximately 20 to 30 mole percent of moiety I, approximately 40 to 60 percent of moiety II, and approximately 20 to 30 mole percent of moiety III.

12. A polyester according to claim 11 wherein the polymer comprises approximately 50 to 60 mole percent of moiety II.

13. A fiber which has been melt spun from the wholly aromatic polyester of claim 9.

14. A fiber which has been melt spun from the wholly aromatic polyester of claim 9 and subsequently thermally treated.

15. A polyester according to claim 9 wherein the melting temperature of the polymer is below approximately 350° C.

16. A polyester according to claim 9 wherein the molar quantities of moieties I and III are substantially equal.

17. A melt processable wholly aromatic polyester capable of forming an anisotropic melt phase at a temperature below approximately 375° C. consisting essentially of moieties I, II, and III, wherein:

I is

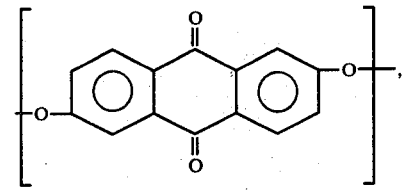

II is

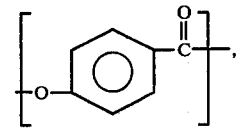

and
III is

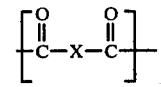

where X represents 1,3-phenylene radicals which optionally are replaced with approximately 25 to 62.5 mole percent of 1,4-phenylene radicals based upon the total concentration of moiety III in said polyester, and wherein said polyester comprises approximately 20 mole percent of moiety I, approximately 60 mole percent of moiety II, and approximately 20 mole percent of moiety III.

18. A polyester according to claim 17 wherein said 1,3-phenylene radicals of moiety III are replaced with approximately 50 mole percent of 1,4-phenylene radicals based upon the total concentration of moiety III in said polyester.

19. A fiber which has been melt spun from the wholly aromatic polyester of claim 17.

20. A fiber which has been melt spun from the wholly aromatic polyester of claim 17 and subsequently thermally treated.

21. A polyester according to claim 17 wherein the melting temperature of the polymer is below approximately 350° C.

* * * * *